United States Patent [19]

Settineri et al.

[11] 3,928,690

[45] Dec. 23, 1975

[54] RELEASE COATED ADHESIVE TAPE

[75] Inventors: Robert A. Settineri, Telford, Pa.;
John T. O'Brien, Cheshire, Conn.

[73] Assignee: W. R. Grace & Co., Cambridge, Mass.

[22] Filed: Dec. 30, 1974

[21] Appl. No.: 537,625

[52] U.S. Cl. ............... 428/40; 427/208; 428/343; 428/341; 428/352; 428/411; 428/537; 428/906; 428/153
[51] Int. Cl.² .................. C07C 121/00; B32B 7/10
[58] Field of Search............ 260/79.3 A, 78.5 N, 79, 260/534 S, 465.4, 79, 85.5 R; 428/352, 40

[56] References Cited
UNITED STATES PATENTS

| | | | |
|---|---|---|---|
| 3,498,943 | 3/1970 | Dannals | 260/85.5 |
| 3,668,230 | 6/1972 | Dannals | 260/465.4 |
| 3,759,860 | 9/1973 | Peaker | 260/79.7 |

*Primary Examiner*—George F. Lesmes
*Assistant Examiner*—R. J. Roche
*Attorney, Agent, or Firm*—Edward J. Hanson, Jr.; C. E. Parker

[57] ABSTRACT

Release coated pressure sensitive adhesive tape utilizing release coating compositions that are alkyl sulfide, alkyl sulfoxide and alkyl sulfone terminated oligomers. Superior release, printability, water base non-polluting characteristics and high temperature-high humidity aging resistance are obtained.

29 Claims, No Drawings

RELEASE COATED ADHESIVE TAPE

BACKGROUND OF THE INVENTION

The disclosure of the composition of the oligomers is contained in U.S. Pat. No. 3,668,230, June 6, 1972 (Dannals) and U.S. Pat. No. 3,839,405, Oct. 1, 1974 (Dannals). These patents disclose the general class of alkyl thio, sulfoxide, and sulfone terminated low molecular weight polymers.

The use of the oligomers as emulsifiers is further disclosed in U.S. Pat. No. 3,498,942, Mar. 3, 1970 (Dannals) which discloses the use of alkyl thio-terminated oligomers, having appendent cyano and carboxyl groups on the oligomeric portion as emulsifiers in emulsion polymerization, in U.S. Pat. No. 3,632,466, Jan. 4, 1972 (Peaker) which discloses stabilizing latex coating compositions containing the oligomers and in U.S. Pat. No. 3,772,382, Nov. 13, 1973 (Dannals), U.S. Pat. No. 3,776,874, Dec. 4, 1973 (Dannals), and U.S. Pat. No. 3,759,860, Sept. 18, 1973 (Peaker), which disclose similar use for the alkyl sulfoxide and sulfone-terminated oligomers.

No use of the oligomers as release agents has been disclosed.

Many present day non-printable release coatings are made up in organic solvents such as toluene, benzene or aqueous organic solvents such as an alcohol water solvent. These organic solvents, due to their polluting effect, supply problems and rising cost are beind abandoned. Such a release agent is polyvinyl n-octadecyl carbamate as set forth in U.S. Pat. No. 2,532,011 (Dahlquist et al.).

Many present day printable release coatings are also in use which are non-polluting but virtually all such coatings fail badly when aged under high humidity conditions. Such release coats are available as anionic latices of acrylonitrile - ethyl acrylate copolymers containing 27 weight percent acrylonitrile. The present invention combines the desirable properties of both types in one and the same material.

SUMMARY OF THE INVENTION

The release coated structures of the present invention employ as an essential ingredient oligomers that may be represented by the following structural formula:

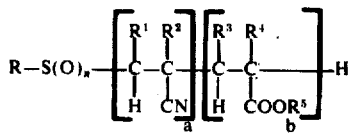

wherein R is an alkyl group having from 12 to 22 carbon atoms; $R^1$ and $R^2$ may be the same or different and are hydrogen, a $-CH_3$ or a $-C_2H_5$ group; $R^3$ is hydrogen, a $-CH_3$, $-C_2H_5$ or $-COOR^5$ group, and $R^4$ is hydrogen, a $-CH_3$, $-C_2H_5$, $-COOR^5$ or $-CH_2COOR^5$ group, provided that $R^3$ is other than $-COOR^5$ if $R^4$ is $-COOR^5$ or $-CH_2COOR^5$; $R^5$ is hydrogen or a cation based on an alkali metal, ammonia or an amine; $(a+b)$ is from 4 to 100, $a/(a+b)$ is from 0.0 to 0.6; and $n$ has a value of 0, 1 or 2.

The release coating may be applied to conventional surfaces usually contacted with pressure sensitive adhesive materials. Such surfaces include but are not limited to paper, rubber latex - impregnated paper, non-fibrous regenerated cellulose film, fiberglass, plastic and the like.

One object of the instant invention is to provide a pressure sensitive tape structure having a release coating which when engaged with the adhesive reduces the amount of pull required to peel the adhesive from the backing material without appreciably decreasing the adhesiveness of the adhesive material which has been removed. Another object of the instant invention is to provide such a tape structure having the release coating deposited from water thereby eliminating problems such as pollution caused by organic solvents and the like. Still another object of the invention is to provide a release coating that is odorless and non-toxic. Other important objects are to provide a tape structure having the adhesive engaged with a release coating in which the release coating is printable and resistant to deterioration, particularly when the assembled tape structure is subjected to high temperature and high humidity. Another object is to provide a tape structure having low unwind forces at high unwind speed and resistance to unwind force build-up after aging at high temperature and high humidity. These and other objects are obtained by the release coating and tape assembly of this invention.

DESCRIPTION OF THE PREFERRED EMBODIMENT

The present invention, in a preferred embodiment, is a self-wound pressure-sensitive adhesive tape containing a flexible backing. One side of the backing is coated with a pressure-sensitive adhesive and the opposite side is coated with a release coating. When the tape is wound on a roll the adhesive is engaged against the release coating. When the tape is unwound the adhesive is disengaged from the release coating. A most important property is, of course, the quality if the adhesive of the tape after it is removed from contact with the release coating. In addition it is important that the engagement of the adhesive with the release coating be such that the roll structure is maintained integral until it is time to use the tape and that the adhesive surface be protected from external contamination.

In the present invention the entirely new component of the tape is the release coating. The essential composition of this release coating is the oligomer described in the SUMMARY OF THE INVENTION section above.

The average molecule of the oligomer may be represented by the formula as described above. The formula is not intended to depict the actual structure of the oligomers because the structural units are randomly distributed throughout the molecule. In the formula R is linear or branched primary, secondary or tertiary alkyl radical having from 12 to 22 carbon atoms such as 2-dodecyl, 3-dodecyl, 2,3-dimethyldecyl, 2-ethyldecyl, 2,5-dimethyldecyl, n-pentadecyl, 2-hexadecyl, n-heptadecyl, 2-heptadecyl, 2-methyl-2-hexadecyl, 2-octadecyl, 2-methyl-2-heptadecyl, 2-ethyl-2-hexadecyl, n-nonadecyl, n-eicosyl, sec- eicosyl, n-heneicosyl, n-docosyl and others. Preferably R is a linear or branched primary alkyl or a linear secondary alkyl radical having from 13 to 20 carbons, most preferably R is a linear or branched primary alkyl group having from 13 to 18 carbons atoms; $R^1$ and $R^2$ are hydrogen, A $-CH_3$ or $-C_2H_5$ group, $R^3$ is hydrogen, a $-CH_3$, $-C_2H_5$ or $-COOR^5$ group, and $R^4$ is hydrogen, a $-CH_3$, $-C_2H_5$, —COOR⁵ or —CH₂COOR⁵ group, provided that R³ is other than —COOR⁵ if R⁴ is —COOR⁵ or —CH₂COOR⁵; R¹, R², R³ and R⁴ are preferably hydrogen. R⁵ is hydrogen or a cation based on an alkali metal such as lithium, sodium, or preferably potassium, or based on ammonia or a primary secondary or tertiary amine such as mono-, di- and triethylamine, dimethylethanolamine, diethanolamine, triethanolamine, also morpholine, piperidine, pyridine and others.

The subscripts $a$ and $b$ indicate the total moles of monomers containing the CN group and the total moles of monomers containing the COOR⁵ group respectively per molecule. The degree of polymerization may be expressed as the sum of $a$ plus $b$, the value of $(a+b)$ ranging from 4 to 100, preferably from 8 to 50 and most preferably from 12 to 50. The mole fraction of the CN group carrying monomers within the molecule is represented by the expression $a/(a+b)$ which usually has a value of from 0.0 to 0.6, preferably from 0.0 to 0.5 and most preferably from 0.25 to 0.5. The subscript $n$ has a value of 0, 1 or 2, most preferably 0.

The preferred oligomers of this invention are produced by the copolymerization of acrylic acid with acrylonitrile in alcohol, for example, methanol, ethanol, or isopropanol, and in the presence of a mercaptan, for example, n-octadecyl mercaptan, such that amounts of each monomer species correspond to the desired levels of $a$ and $b$ in the product. The oligomers so prepared may then be neutralized with a base such as potassium hydroxide.

The oligomers are usually stripped of unreacted monomer and alcohol, for instance by sparging steam through the solutions. The stripping may be performed with the acidic reaction product or the partially or completely neutralized product. The point at which such stripping is performed is not critical to the utility of the product as a release agent. Furthermore, the stripping itself is not essential to the utility of the oligomers. The unstripped solution of the neutralized product may be used as a release agent for pressure sensitive adhesives without further purification or removal of traces of catalyst, monomer residues, or solvent. The reaction solids during polymerization are also not critical as far as the utility of the oligomers is concerned.

A portion of the neutralized product in the aqueous or aqueous alcohol solution may tend to cream; but upon agitation readily reverts to its original uniform state. The neutralized product usually is further diluted with water to low solids such as a 2 to 3 per cent oligomer concentration in order to afford a solution more suitable for coating paper to form a release coated paper. Further details of the preparation of the oligomers useful in this invention are in U.S. Pat. Nos. 3,498,942 and 3,668,230 incorporated by reference herein.

The essential composition of the release coating may be applied to substrates in various ways. The coating may be applied directly to one side of a tape already coated or to be coated on the other side with a pressure sensitive adhesive. The coating may also be applied to one or both sides of a removable liner that is to be engaged by an adhesive such as a pressure sensitive adhesive. The coating may be applied in the form of a solution or a dispersion by conventional means well known in the art, e.g. the solution or dispersion may be pumped, poured or siphoned without deleterious effect, and may be applied to the tape substrate by spraying, doctor blading, roller coating, dipping, brushing, air-knifing or Mayer rod coating.

After application of the release coating to the surface, the material is dried by conventional means, i.e. heating the material at temperatures in the range 230° (110°C) to 380°F (195°C) in conventional drying ovens or other well known means. This heating step not only facilitates evaporation of the water and any solvent present in the release coating composition but also causes the material to flow enhancing uniformity of the coating. However, it should be noted that after applying the oligomer, heating is not a necessary step to obtain a film having release properties. The coated surface can even be allowed to dry at room temperature.

In applying the release coating composition to the substrate, the amount of total solids in the dispersion or solution should be sufficient to provide a very thin film on the substrate, said film being effective as a release coating. Conventional release coatings usually have thicknesses of a fraction of a mil. Coated weights in the range 0.001 to 0.1 ounce/square yard (0.034 to 3.4 g/m²) exclusive of additives are sufficient to obtain a substantially continuous thin film of the release material on the substrate surface.

The release composition of the instant invention may contain other materials well known in the art of release coating compositions in conventional amounts which do not materially affect the release character of the composition. For example, the composition may contain pigments such as titanium dioxide or phthalocyanine blue. Additionally the composition may contain extenders such as mineral fillers, inert resins or thermosetting resins as the use may require.

A preferred form of the invention would have the following parameter. An adhesive engaged with an release coating, the release coating being comprised of an oligomer represented by the formula

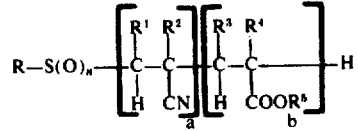

wherein R, R¹, R², R³, R⁴ and R⁵ as well as the subscripts $a$, $b$ and $n$ have the meanings set forth above.

The oligomer preferably has a molecular weight between 200 and 5,000 and is applied from a aqueous solution or dispersion. The release coating oligomer is preferably present in a quantity of 0.01 to 0.04 oz/yd² (0.34 to 1.4 g/m²).

The preferred embodiment would be in the form of a pressure sensitive adhesive tape with a flexible backing of creped cellulose sheet saturated with latex, exemplary latices are ABS, acrylic, SBR, acrylonitrile, neoprene and copolymers and blends thereof. The sheet is usually in the form of a long tape. A base coating is preferably applied to the backing surfaces that are to be coated with the release coating. The base coating is preferably a vinyl or an acrylic latex, exemplary vinyl latices would be films deposited from poly(vinyl acetate), poly(vinyl chloride), poly(vinyl chloride-acrylic) or blends of these with other coating latices familiar to those skilled in the art. Preferably the release coating would be on one side of the flexible backing and the adhesive on the opposite side, and the tape is wound upon itself. The side of such a pressure sensitive tape coated with the release coating may be called the back side while the side with the adhesive may be called the front of the tape.

The invention is further illustrated by the following examples:

EXAMPLES

General procedure for preparing the alkyl sulfide terminated oligomers.

The oligomeric material having the general formula alkyl-S-(acrylonitrile)$_a$ - (acrylic acid)$_b$ - H is prepared in methanol using ammonium persulfate as the initiator or in isopropanol using decanoyl or lauroyl peroxides as the initiator. Activators such as N,N-dimethyl aniline (DMA) may be added as required.

The acrylic acid, acrylonitrile, alkyl mercaptan, and solvent (isopropanol) are added to a reaction vessel which is set in a water bath or jacket preset to the reaction temperature and equipped with an addition funnel, a thermometer or thermocouple, an agitator, a water cooled condenser, and a nitrogen inlet. Nitrogen gas purges the air (which contains oxygen) from the reaction vessel providing an inert atmosphere. Agitation of the solution is begun and nitrogen flow is started immediately thereafter. When the reaction temperature equilibrates to the bath temperature, the initiator in solution in the solvent (isopropanol) is added at a controlled rate of about 1 g of initiator per mole of monomers per minute. The initiator solution concentration may be one gram of lauroyl peroxide per 10 ml of isopropanol. If so desired the initiator may be added neat. About 0.25 ml of DMA per mole of monomers may be added to the reactor if required. Since the reaction is exothermic, constant reaction temperature is maintained by cooling.

EXAMPLE 1

The following materials are combined in a 1 quart bottle according to the procedure outlined above in order to produce the following oligomers:
n-octadecyl-S-(acrylonitrile)$_4$ - (acrylic acid)$_{12}$ - H
20 ml acrylonitrile (16g, 0.302 moles)
60 ml acrylic acid (63g, 0.877 moles)
84 ml 25% n-octadecylmercaptan in isopropanol (25g/100 ml)
59 ml isopropanol
10 ml 10% decanoyl peroxide in isopropanol (10g/100 ml)

In addition 1 ml of 25% DMA in isopropanol (25g/100 ml) can be added, if desired, to increase the reaction rate, but it is not essential as far as the final composition and utility of the oligomer is concerned.

(As set forth in subsequent Example this oligomer would be R = n-octadecyl; $a+b$ = 16.0; $a/(a+b)$ = 0.256; acrylonitrile $g$ = 16; acrylic acid $g$ = 63; mercaptan $g$ = 21; catalyst g/mole = 0.85.)

The bottle is sealed after all reagents have been added and is immersed in a water bath set at 50°C. After 16 hours the sample is removed, and has 40% solids. The acidic reaction product is a clear, straw colored solution at 50°C, but becomes a viscous, two phase slurry upon cooling to room temperature 22°C).

Neutralization is carried out as follow: 50 ml water are added to 150g acidic reaction product. Neutralization is performed using one equivalent of KOH (about 75g of 45% KOH). After 20% of the KOH has been added, the mixture is stripped of the unreacted monomers and solvent by placing the mixture in a Buechi Model VE-50 Rotovapor under vacuum. After stripping, the remainder of the KOH is added until a pH of 9 is obtained.

In order to evaluate the release agent the solution is diluted with water to a total solids of about 2.5% and coated onto commercially available 8½ × 11 inch tape backing sheets, i.e. ENDURA (trademark) 13497, W. R. Grace & Co. A number 20 Mayer rod is used for obtaining a dry coating of about 0.03 oz/yd.$^2$ (1.12 g/m$^2$) after drying at 375°F (190°C) for 1 minute. The release coated test backing so obtained is laid on a flat surface and 1 inch (2.54 cm) wide commercially available adhesive tape, i.e., Armak PF-2, Armak Tape Company, is applied to the test backing so that the machine direction of the adhesive tape parallels the machine direction of the test backing. Using a 4½ pound (2.04 kg.) roller the test tape is rolled against the test backing 3 times in each direction. Samples of the laminate are cut to convenient sizes, slightly wider than the 1 inch adhesive tape, and aged by I. being subjected to standard conditions, i.e. 23 ± 2°C and a relative humidity of 50 ± 2% at that temperature for 76 hours; or II. being subjected to accelerated aging conditions of high temperature and high humidity by being placed in a desiccator containing saturated (NH$_4$)$_2$SO$_4$ solution and held at 150°F ± 2°F (66 ± 2°C) for 72 hours. The relative humidity is approximately 85%. Thereafter the samples are subjected to the standard temperature and humidity conditions of (I) for 4 hours before testing.

The aged samples are then evaluated using several tests: An average of 3 test at each aging condition is performed.

Test A

Aged samples are subjected to a hand zip test by placing them on a flat horizontal surface. While one hand is holding the backing down to the surface, the other hand pulls the test tape rapidly (approximately 200 ft./min) (61m/min) from the backing at an angle of 180°. The sample from both aging conditions removed readily without any noted tearing, adhesive transfer, delamination or any other damage to the adhesive tape.

The performance of the samples is rated according to the following nomenclature:
1 — very easy to pull, superior performance
2 — easy to pull
3 — pull requires medium effort
4 — somewhat difficult to pull
5 — difficult to pull, stiff For the sample aged under condition (I) the rating is 1, and for the samples aged under condition (II) the rating is 2 on the average.

Test B

Other aged samples are tested in accord with PSTC-1 (Pressure Sensitive Tape Council Test Methods, 5th Edition) in an adhesion to backing test.

The aged samples are attached to a steel test panel using double faced pressure sensitive tape. The free end of the test tape is doubled back at an angle of 180° and peeled from the backing for a distance of 1 inch (2.54 cm). The tape free end of the backing covered panel is clamped into the lower jaw of a tensile testing machine (described below) and the free end of the tape into the upper jaw. The jaws are separated at the rate of 12 inch (30.5 cm) per minute in order to peel the test tape off the release coated test backing. The results are: The average adhesion value for the samples aged under condition (I) is 21 oz./inch (234g/cm) width, and for samples aged under condition (II) the adhesion value is 27 oz./inch (301 g/cm) width.

The tensile or adhesion testor consists of an upper jaw and a lower jaw situated opposing each other in the same verticle plane. The upper jaw is connected to a dial spring scale, Chatillon type 4200, capacity 15 pounds (6.81 kilograms) set off in one half ounce (14.19 grams) increments, which is in turn rigidly attached to an upper frame member. The lower jaw is rigidly attached to a movable frame member such that when the device is activated through a constant speed motor, gear train and screw assembly, the lower jaw moves vertically downward at a constant speed of 12 inches/minutes (30.5 centimeters/min). The upper jaw remains at rest.

Test C

The test tapes pulled off in Test B are subjected to the adhesion to steel test described in PSTC-1. The adhesive tape pulled from the release coated backing in Test B is applied directly to a clean steel panel and rolled thereon once in each direction with a 4½ pound (2.04 Kg) roller at 12 in./min. (30.5 cm/min). The free end of the tape is doubled back at an angle of 180° and peeled off the panel for a distance of 1 inch (2.45 cm). The panel end from which the tape is removed is clamped into the lower jaw of the tensile testing machine described in Test B and the free end of the tape into the upper jaw. The jaws are separated at a rate of 12 inch (30.5cm) per minute in order to peel the tape from the steel panel. The adhesion value for the tape aged according to Condition (I) is 29.5 oz./inch (323 g/cm) width, and for the tape aged under Condition (II) the adhesion value is 25 oz./inch. (279 g/cm) width, indicating a loss of adhesiveness due to aging under Condition (II) of only about 15 percent, a loss well below the 40 percent which is commercially acceptable.

Test D

Other aged samples are further tested in accord with PSTC-6 in the Rolling Ball Tack test: The adhesive tape is stripped off by hand at moderate speed (15–20 inches (38-57 cm)/second). and placed with the adhesive side up in line with the race way of the incline of the rolling ball testing apparatus. A steel ball (7/16 inch(1.11cm) diameter) is rolled down the incline. The average stopping distance of 6 tests for each of the two aged condition is determined. The results are as follows: the stopping distance for the samples aged under condition (I) is 1.5in. (3.8 cm), and for those aged under condition (II) is 0.9 in. (2.3 cm) on the average.

Test E

The release coated test backing is further tested for printability by cutting the release coated test backing into strips about 4 in. (10.2 cm) wide. The test backing, release side up, is placed on a flat horizontal surface and each edge of each sample is fastened so that the backing can not slide. Using a IPI Anilox Flexo hand proofer with Gotham 17098 tape black Flexo ink and a 165 line doctor roller, strips of ink are rolled down on the release side of the backing. The ink is allowed to air dry for more than 20 minutes and then the adhesive tape previously identified is applied to the inked surface. To secure the tape to the surface, a 4½ lb. (2.04 Kg) roller is rolled against the test tape 3 times in each direction. The laminate is aged for more than 20 minutes and then the adhesive tape is pulled rapidly from the inked surface at an angle of 180° to the test backing. The ink pick-off is 2 percent. This is the percent of ink coverage that transferred to the test tape from the test backing. The performance factor as defined below, is determined to have a value of 8.0.

EXAMPLES 2 – 20

Additional oligomers prepared essentially in the same manner as in Example I are listed in Table I. Their effectiveness as release agents is determined following the procedures and tests (A through E) as set forth in Example I. The results are summarized in Table II. The control listed in Table II is ENDURA tape backing 13723 which is release coated and is obtainable as a commercial tape backing product from W. R. Grace & Co. It is used in the same manner as the tape backing of the present invention.

TABLE I

| Examples[1] | Preparation of R-S-(Acrylonitrile)$_a$-(Acrylic Acid)$_b$-H | | | | | | Catalyst g/mole | Conversion Conversion |
|---|---|---|---|---|---|---|---|---|
| | R | a+b | a/(a+b) | Acrylonitrile g | Acrylic Acid g | Mercaptan g | | monomer |
| 2 | primary tridecyl | 12.1 | 0.256 | 16.0 | 63.0 | 21.0 | 0.85 | 80% |
| 3 | n-tetradecyl | 12.9 | 0.256 | 16.0 | 63.0 | 21.0 | 0.85 | 59 |
| 4 | n-hexadecyl | 14.4 | 0.256 | 16.0 | 63.0 | 21.0 | 0.85 | 74 |
| 5 | t-hexadecyl | 14.4 | 0.256 | 16.0 | 63.0 | 21.0 | 0.85 | 80 |
| 6 | n-octadecyl | 8.0 | 0.125 | .6.4 | 59.8 | 34.0 | 1.01 | 64 |
| 7 | n-octadecyl | 8.0 | 0.250 | 12.8 | 52.5 | 34.8 | 1.04 | 52 |
| 8 | " | 8.1 | 0.370 | 20.0 | 45.1 | 35.5 | 1.07 | 53 |
| 9 | " | 15.9 | 0.000 | 0.0 | 79.8 | 20.0 | 0.90 | 99 |
| 10 | " | 16.0 | 0.375 | 24.0 | 54.6 | 21.7 | 0.83 | 75 |
| 11 | " | 16.1 | 0.496 | 32.8 | 45.1 | 22.2 | 0.82 | 62 |
| 12 | " | 24.2 | 0.124 | 8.0 | 77.7 | 14.5 | 0.81 | 85 |
| 13 | " | 24.1 | 0.249 | 16.8 | 68.2 | 15.0 | 0.80 | 77 |
| 14 | " | 24.0 | 0.371 | 25.6 | 58.8 | 15.5 | 0.76 | 88 |
| 15 | " | 32.2 | 0.000 | 0.0 | 89.2 | 11.0 | 0.81 | 100 |
| 16 | " | 32.0 | 0.250 | 17.6 | 71.4 | 11.8 | 0.80 | 87 |
| 17 | " | 31.9 | 0.498 | 36.8 | 50.4 | 12.5 | 0.72 | 86 |
| 18 | " | 40.6 | 0.128 | 8.8 | 81.9 | 9.2 | 0.77 | 94 |
| 19 | " | 40.1 | 0.376 | 28.0 | 63.0 | 10.0 | 0.71 | 84 |

TABLE I-continued

Preparation of R-S-(Acrylonitrile)$_a$-(Acrylic Acid)$_b$-H

| Examples[1] | R | a+b | a/(a+b) | Acrylonitrile g | Acrylic Acid g | Mercaptan g | Catalyst g/mole | Conversion Conversion |
|---|---|---|---|---|---|---|---|---|
| 20 | " | 48.8 | 0.254 | 18.4 | 73.5 | 8.0 | monomer 0.80 | 87 |

Conditions:
[1]Bath temperature pre set to 50°C 127 ml isopropanol total
Reaction time 16 hours, no DMA added

TABLE II

| Test: | A | | B | | C | | D | | E | |
|---|---|---|---|---|---|---|---|---|---|---|
| Results in: | Rating | | oz/in. width | | | | in. of roll | | %-pick-off | |
| Condition: | I | II | I | II | I | II | I | II | | |
| Example | | | | | | | | | | PF** |
| 2 | 1 | 3 | 27 | 35.5 | 29.5 | 28.5 | 0.5 | 0.35 | 1 | 5.4 |
| 3 | 1 | 3 | 26 | 34.5 | 29.5 | 20 | 1.15 | 1.0 | 4 | 1.0 |
| 4 | 1 | 2.5 | 21 | 36 | 33 | 23 | 1.15 | 1.0 | 2 | 2.6 |
| 5 | 2 | 5* | 28 | 41 | 29 | 30 | 0.75 | 0.15 | 2 | 0.3 |
| 6 | 2 | 1 | 23.5 | 29 | 27 | 17 | 0.5 | 0.5 | 7.5 | 1.8 |
| 7 | 1.3 | 1.1 | 24 | 29 | 31 | 15 | 0.8 | 3.25 | 5 | 1.5 |
| 8 | 1.1 | 1 | 23 | 27.5 | 34 | 16.5 | 1.4 | 2.6 | 10 | 1.2 |
| 9 | 1 | 2 | 21.5 | 31 | 34 | 21.5 | 1.15 | 0.6 | 20 | 0.5 |
| 10 | 1 | 2 | 24 | 36 | 32 | 24 | 1.0 | 0.9 | 1 | 5.6 |
| 11 | 1.3 | 3 | 23 | 34 | 30 | 23.5 | 1.0 | 0.55 | 1 | 4.0 |
| 12 | 1 | 1 | 24 | 30 | 32 | 24.5 | 1.35 | 0.65 | 12.5 | 1.6 |
| 13 | 1 | 2.5 | 24 | 37 | 33 | 30 | 1.15 | 0.4 | 3 | 2.9 |
| 14 | 2 | 2 | 23 | 31 | 30 | 26 | 1.25 | 0.65 | 3 | 3.7 |
| 15 | 1 | 3 | 23.5 | 28 | 32.5 | 24 | 1.35 | 0.75 | 5 | 1.3 |
| 16 | 2 | 1 | 24.5 | 32 | 31.5 | 24 | 1.0 | 1.5 | 3 | 4.2 |
| 17 | 3 | 3 | 23 | 33.5 | 33 | 27 | 1.25 | 0.5 | 2 | 2.9 |
| 18 | 1 | 1 | 22 | 31.5 | 29 | 22 | 1.25 | 0.6 | 4 | 3.8 |
| 19 | 2 | 2 | 24.5 | 32.5 | 30 | 23.5 | 1.0 | 0.65 | 3 | 3.2 |
| 20 | 2 | 1 | 22 | 31.5 | 30 | 27 | 1.0 | 1.0 | 4 | 4.3 |
| Control | 1 | 5* | 20.8 | 35.5 | 29.5 | 27 | 1.0 | 1.15 | 1 | 0.3 |

Remarks:
*delamination
**Performance Factor

As already mentioned previously the release agents of this invention combine desirable properties in a unique way which other materials, including those widly used by the industry do not achieve, i.e., as the various test results indicate, not only do these compounds permit good to excellent adhesion as demonstrated by Test C and D, but also remarkable printability according to the Test E results. Their superior performance is further emphasized by the low or at least acceptable adhesion to the backing (see Test B) but especially by the extraordinary ease with which rapid separation of the adhesive coated tape from the release coated backing can be accomplished even after having been exposed to the severe Aging Condition (II). These overall properties of the release agents of this invention are summarized by the Performance Factor (PF) as expressed by the following equation:

$$PF = \frac{C_{II}}{B_{II}} \frac{(6-A_{II})^2}{(D_{II} + E)}$$

wherein, for any given example $C_{II}$ = adhesion to steel (Test C) in oz./inch width after aging Condition II $B_{II}$ = adhesion to backing (Test B) in oz./inch width after aging Condition II $A_{II}$ = rating according to Hand Zip Test (A) after aging under Condition II $D_{II}$ = Ball test result in "inch of roll" after aging under Condition II $E$ = % ink pick-off according to Test (E)

The Performance Factors of the compounds tested further underline the qualities of the instant release agents ranging from at least equal to vastly superior over those of the Control which is a widely accepted commercial product. Although a PF- value of as low as 0.3 may be commercially acceptable under certain conditions, compounds having a PF-value of 2.00 or higher are preferred, and compounds having a PF-value of 3.0 or more are particularly desirable. Although the Performance Factor values are applicable only to the systems used herein it is believed that employing different testing materials will not appreciably change the values in relation to each other.

EXAMPLE 21

The preparation of the oligomers may be readily accomplished on a larger scale; therefore, the following materials are added to a one liter resin flask following the general procedure outlined above in order to produce the oligomer:

n-octadecyl - S - (acrylonitrile)$_4$- (acrylic acid)$_{12}$ - H
The bath temperature is preset to 39°C.
60 ml acrylonitrile (48 g, 0.906 moles)
180 ml acrylic acid (189 g, 2.63 moles)
63 g n-octadecyl mercaptan; 97% (0.220 moles)
300 ml isopropanol
3 g decanoyl peroxide
1 ml DMA In accordance with the general formula: R = n-octadecyl; $a + b = 16.0$; $a/(a+b) = 0.256$; acrylcnitrile g = 16; acrylic acid g = 63; mercaptan g = 21; catalyst, g/mole mono = .85; DMA is added in order to increase the reaction rate.

After one-half hour the temperature rises to about 46°C over a period of 1 hour, and returns to about 40°C after an additional 1½ hours. Ten more drops of DMA are added and a slight exotherm is observed. After three more hours, the reaction flask is removed from the bath. The total reaction time is 6 hours. The conversion is 99%, and the solids are 55.6%. The acidic reaction product is a clear, straw colored solution at 40°C, but becomes a viscous, two phase slurry upon cooling to room temperature.

Neutralization is carried out as follows: 300 ml of water are added to the acidic reaction product. Neutralization is preformed using one equivlant of KOH (about 327 g of 45% aqueous KOH). After 23% of the KOH has been added the mixture is stripped of the unreacted monomer and the alcohol by placing the mixture in a Buechi Rotovapor (Model VE-50) under vacuum. After stripping, the remaining 77% of the KOH is added until a solution pH of 9 is obtained. When tested as a release agent as described in Example 1 the thus prepared oligomer exhibits essentially the same results as the comparable Example 1 oligomer.

No present day release coating system for pressure sensitive tape offers the unique combination of efficient or controlled release, freedom from adhesive degradation, printability by commonly used low cost flexographic inks, stability of these properties under severe aging conditions along with non toxic and pollution free application conditions that is offered by the instant invention. While nearly all of the above advantages can be found separately or in partial combination the need for a single system which provides all of the above has been obvious among practitioners of the art for many years.

It is claimed:

1. A pressure sensitive adhesive tape comprising a flexible backing which has a pressure sensitive adhesive on one side and a release coating on the other side, said release coating consisting essentially of an oligomer represented by the formula

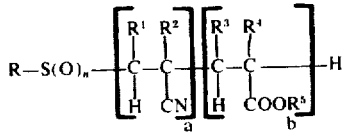

wherein R is a linear or branched alkyl radical having 12 to 22 carbon atoms; $R^1$ and $R^2$ may be the same or different and are hydrogen, a $-CH_3$ or $-C_2H_5$ group; $R^3$ is hydrogen, a $-CH_3$, $-C_2H_5$ or $-COOR^5$ group; $R^4$ is hydrogen, a $-CH_3$, $-C_2H_5$, $-COOR^5$ or $-CH_2COOR^5$ group provided $R^3$ is other than $-COOR^5$ if $R^4$ is $-COOR^5$ or $-CH_2COOR^5$; $R^5$ is hydrogen or a cation based on an alkali metal, ammonia or an amine; $(a+b)$ is from 4 to 100; $a/(a+b)$ is from 0.0 to 0.6; and $n$ has a value of 0, 1 or 2.

2. The adhesive tape of claim 1, wherein said $R^5$ is selected from the group consisting of hydrogen, lithium, sodium and potassium.

3. The adhesive tape of claim 2, wherein R is a linear or branched primary alkyl or a linear secondary alkyl group having from 13 to 20 carbons; $R^1$, $R^2$, $R^3$, and $R^4$ are hydrogen; $(a+b)$ is from 8 to 50, $a/(a+b)$ is from 0.0 to 0.5, and $n$ is 0.

4. The adhesive tape of claim 3, wherein R is a linear or branched primary alkyl radical having 13 to 18 carbon atoms.

5. The adhesive tape of claim 4, wherein $R^5$ is potassium.

6. The adhesive tape of claim 3, wherein $(a+b)$ is from 12 to 50 and $a/(a+b)$ is from 0.25 to 0.5.

7. The adhesive tape of claim 1, wherein said tape is wound upon itself.

8. The adhesive tape of claim 1, wherein said backing is a creped cellulose sheet saturated with ABS latex, and is coated with a vinyl latex base coat between the backing and said release coating.

9. The adhesive tape of claim 1, wherein said oligomer is present in a quantity of 0.001 to 0.1 ounces per square yard.

10. A flexible backing for pressure sensitive adhesive tape having on at least one side a release coating consisting essentially of an oligomer having a structural formula

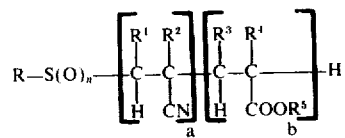

wherein R is a linear or branched alkyl radical having 12 to 22 carbon atoms; $R^1$ and $R^2$ may be the same or different and are hydrogen, a $-CH_3$ or $-C_2H_5$ group; $R^3$ is hydrogen, a $-CH_3$, $-C_2H_5$ or $-COOR^5$ groups; $R^4$ is hydrogen, a $-CH_3$, $-C_2H_5$, $-COOR^5$ or $-CH_2COOR^5$ group, provided $R^3$ is other than $-COOR^5$ if $R^4$ is $-COOR^5$ or $-CH_2COOR^5$; $R^5$ is hydrogen or a cation based on an alkali metal, ammonia or an amine; $(a+b)$ is from 4 to 100; $a/(a+b)$ is from 0.0 to 0.6; and $n$ has a value of 0, 1 or 2.

11. The flexible backing of claim 10, wherein said $R^5$ is selected from the group consisting of hydrogen, lithium, sodium and potassium.

12. The flexible backing of claim 11 wherein R is a linear or branched primary alkyl or a linear secondary alkyl group having from 13 to 20 carbons; $R^1$, $R^2$, $R^3$ and $R^4$ are hydrogen; $(a+b)$ is from 8 to 50, $a/(a+b)$ is from 0.0 to 0.5, and $n$ is 0.

13. The flexible backing of claims 12, wherein R is a linear or branched primary alkyl radical having 13 to 18 carbon atoms.

14. The flexible backing of claim 13, wherein $R^5$ is potassium.

15. The flexible backing of claim 12, wherein $(a+b)$ is from 12 to 50 and $a/(a+b)$ is from 0.25 to 0.5.

16. The flexible backing of claim 10, wherein said backing is a creped cellulose sheet saturated with a latex chosen from the group consisting of ABS, acrylic, SBR, acrylonitrile, neoprene and copolymers and blends thereof, and is coated with a latex base coat between the backing and said release coating, said latex base coat being chosen from the group consisting of vinyl and acrylic latices and mixtures thereof.

17. The flexible backing of claim 10, wherein said oligomer is present in a quantity of 0.001 to 0.1 ounces per square yard.

18. An improved laminar structure having a flexible tape coated with a pressure sensitive adhesive on one side, a release coating adjacent to the adhesive and a flexible backing adhering to the release coating, the improvement comprising said release coating consisting essentially of a release agent which is an oligomer having the structural formula

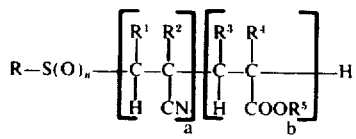

wherein R is a linear or branched alkyl radical having 12 to 22 carbon atoms; $R^1$ and $R^2$ may be the same or different and are hydrogen, a $-CH_3$ or $-C_2H_5$ group; $R^3$ is hydrogen, a $-CH_3$, $-C_2H_5$ or $-COOR^5$ group; $R^4$ is hydrogen, a $-CH_3$, $-C_2H_5$, $-COOR^5$ or $-CH_2COOR^5$ group, provided $R^3$ is other than $-COOR^5$ if $R^4$ is $-COOR^5$ or $-CH_2COOR^5$; $R^5$ is hydrogen or a cation based on an alkali metal, ammonia or an amine; $(a+b)$ is from 4 to 100, $a/(a+b)$ is from 0.0 to 0.6 and $n$ has a value of 0, 1 or 2.

19. The laminar structure of claim 18, wherein R is a linear or branched primary alkyl or a linear secondary alkyl group having from 13 to 20 carbons; $R^1$, $R^2$, $R^3$ and $R^4$ are hydrogen; $(a+b)$ is from 8 to 50, $a/(a+b)$ is from 0.0 to 0.5, and n is 0.

20. The laminar structure of claim 19 wherein R is a linear or branched primary alkyl radical having 13 to 18 carbon atoms, $R^5$ is potassium and $(a+b)$ is from 12 to 50 and $a/(a+b)$ is from 0.25 to 0.5.

21. The laminar structure of claim 18 wherein said oligomer is present in a quantity of 0.001 to 0.1 ounces per square yard.

22. A structure comprising a substrate, a release coat on said substrate and a pressure sensitive adhesive on said release coat, said release coat consisting essentially of an oligomer represented by the formula

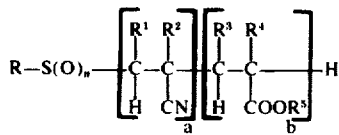

wherein R is a linear or branched alkyl radical having 12 to 22 carbon atoms; $R^1$ and $R^2$ may be the same or different and are hydrogen, a $-CH_3$ or $-C_2H_5$ group; $R^3$ is hydrogen, a $-CH_3$, $-C_2H_5$ or $-COOR^5$ group; $R^4$ is hydrogen, a $-CH_3$, $-C_2H_5$, $-COOR^5$ or $-CH_2COOR^5$ group, provided $R^3$ is other than $-COOR^5$ if $R^4$ is $-COOR^5$ or $-CH_2COOR^5$; $R^5$ is hydrogen or a cation based on an alkali metal, ammonia or an amine: $(a+b)$ is from 4 to 100; $a/(a+b)$ is from 0.0 to 0.6; and $n$ has a value of 0, 1 or 2.

23. The structure of claim 22 wherein R is a linear or branched primary alkyl or a linear secondary alkyl group having from 13 to 20 carbons; $R^1$, $R^2$, $R^3$ and $R^4$ are hydrogen; $(a+b)$ is from 8 to 50, $a/(a+b)$ is from 0.0 to 0.5, and $n$ is 0.

24. The structure of claim 23 wherein R is a linear or branched primary alkyl radical having 13 to 18 carbon atoms, $R^5$ is potassium and $(a+b)$ is from 12 to 50 and $a/(a+b)$ is from 0.25 to 0.5.

25. The structure of claim 22 wherein said oligomer is present in a quantity of 0.001 to 0.1 ounces per square yard.

26. A strucutre comprising an adhesive engaged with a release coating, said release coating consisting essentially of an oligomer represented by the formula

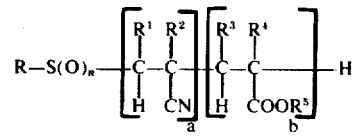

wherein R is a linear or branched alkyl radical having 12 to 22 carbon atoms; $R^1$ and $R^2$ may be the same of different and are hydrogen, a $-CH_3$ or $-C_2H_5$ group; $R^3$ is hydrogen, a $-CH_3$, $-C_2H_5$ or $-COOR^5$ group; $R^4$ is hydrogen, a $-CH_3$, $-C_2H_5$, $-COOR^5$ or $-CH_2COOR^5$ group, provided $R^3$ is other than $-COOR^5$ if $R^4$ is $-COOR^5$ or $-CH_2COOR^5$; $R^5$ is hydrogen or a cation based on an alkali metal, ammonia or an amine; $(a+b)$ is from 4 to 100; $a/(a+b)$ is from 0.0 to 0.6; and $n$ has a value of 0,1 or 2.

27. The structure of claim 26 wherein R is a linear or branched primary alkyl or a linear secondary alkyl group having from 13 to 20 carbons; $R^1$, $R^2$, $R^3$ and $R^4$ are hydrogen; $(a+b)$ is from 8 to 50, $a/(a+b)$ is from 0.0 to 0.5, and $n$ is 0.

28. The structure of claim 27, wherein R is a linear or branched primary alkyl radical having 13 to 18 carbon atoms; $R^5$ is potassium, $(a+b)$ is from 12 to 50; and $a/(a+b)$ is from 0.25 to 0.5.

29. The structure of claim 26 wherein said oligomer is present in a quantity of 0.001 to 0.1 ounces per square yard.

* * * * *

UNITED STATES PATENT OFFICE
CERTIFICATE OF CORRECTION

Patent No. 3,928,690          Dated December 23, 1975

Inventor(s) Robert A. Settineri et al.

It is certified that error appears in the above-identified patent and that said Letters Patent are hereby corrected as shown below:

On the cover sheet assignee should read

-- W. R. Grace and Co., Cambridge, Mass., and

Uniroyal Inc., Middlebury, Conn. --.

Column 12, line 29, "groups" should read -- group --.

Column 14, line 28, "of" should read -- or --.

Signed and Sealed this

Second Day of November 1976

[SEAL]

Attest:

RUTH C. MASON
*Attesting Officer*

C. MARSHALL DANN
*Commissioner of Patents and Trademarks*